(12) United States Patent
Yoon et al.

(10) Patent No.: US 9,934,085 B2
(45) Date of Patent: Apr. 3, 2018

(54) INVOKING AN ERROR HANDLER TO HANDLE AN UNCORRECTABLE ERROR

(71) Applicant: Hewlett-Packard Development Company, L.P., Houston, TX (US)

(72) Inventors: Doe-Hyun Yoon, Palo Alto, CA (US); Jichuan Chang, Palo Alto, CA (US); Naveen Muralimanohar, Palo Alto, CA (US); Parthasarathy Ranganathan, Palo Alto, CA (US); Robert Schreiber, Palo Alto, CA (US); Norman Paul Jouppi, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 112 days.

(21) Appl. No.: 14/785,071

(22) PCT Filed: May 29, 2013

(86) PCT No.: PCT/US2013/042980
§ 371 (c)(1),
(2) Date: Oct. 16, 2015

(87) PCT Pub. No.: WO2014/193350
PCT Pub. Date: Dec. 4, 2014

(65) Prior Publication Data
US 2016/0062821 A1    Mar. 3, 2016

(51) Int. Cl.
*G06F 11/00* (2006.01)
*G06F 11/08* (2006.01)
(Continued)

(52) U.S. Cl.
CPC ........ *G06F 11/085* (2013.01); *G06F 11/1048* (2013.01); *G06F 11/1471* (2013.01); *G06F 17/30424* (2013.01); *G06F 11/1469* (2013.01)

(58) Field of Classification Search
CPC . G06F 11/1471; G06F 11/085; G06F 11/1048
See application file for complete search history.

(56) References Cited

U.S. PATENT DOCUMENTS 6,622,260 B1   9/2003   Marisetty
6,934,903 B1   8/2005   Keltcher
(Continued)

FOREIGN PATENT DOCUMENTS

CN         1682193 A      10/2005
CN         101558385      10/2009
(Continued)

OTHER PUBLICATIONS

Glosli et al., Extending Stability Beyond CPU Millennium—A Micron-Scale Atomistic Simulation of Kelvin-Helmholtz Instability, Nov. 2007, 11 Pages.
International Searching Authority, The International Search Report and the Written Opinion, Feb. 25, 2014, 14 Pages.
Jeffrey C Mogul et al., PCT/US20121058056 filed Sep. 28, 2012 (41 pages).
(Continued)

*Primary Examiner* — Yolanda L Wilson
(74) *Attorney, Agent, or Firm* — Trop, Pruner & Hu, P.C.

(57) ABSTRACT

A detector detects, using an error code, an error in data stored in a memory. The detector determines whether the error is uncorrectable using the error code. In response to determining that the error is uncorrectable, an error handler associated with an application is invoked to handle the error in the data by recovering the data to an application-wide consistent state.

18 Claims, 3 Drawing Sheets

(51) Int. Cl.
*G06F 11/10* (2006.01)
*G06F 17/30* (2006.01)
*G06F 11/14* (2006.01)

(56) References Cited

U.S. PATENT DOCUMENTS

| | | | |
|---|---|---|---|
| 7,043,679 | B1 | 5/2006 | Keltcher |
| 7,139,942 | B2 | 11/2006 | Subramanian |
| 7,171,591 | B2 | 1/2007 | Chen |
| 7,177,989 | B1 | 2/2007 | McGinnis |
| 7,587,625 | B2 * | 9/2009 | Alexander ............ G06F 11/106 714/42 |
| 2006/0259848 | A1 | 11/2006 | Blevins |
| 2007/0234112 | A1 | 10/2007 | Thayer et al. |
| 2009/0150599 | A1 * | 6/2009 | Bennett ............... G06F 11/1441 711/103 |
| 2009/0150641 | A1 * | 6/2009 | Flynn ..................... G06F 3/061 711/202 |
| 2009/0282300 | A1 * | 11/2009 | Heyrman ........... G06F 11/2082 714/708 |
| 2011/0239061 | A1 * | 9/2011 | Li ......................... G06F 11/073 714/704 |
| 2012/0221924 | A1 | 8/2012 | Flynn et al. |

FOREIGN PATENT DOCUMENTS

| | | |
|---|---|---|
| WO | WO-2007098062 A2 | 8/2007 |
| WO | WO-2007098062 A3 | 8/2007 |

OTHER PUBLICATIONS

Jian, X. et al., Adaptive Reliability Chipkill Correct, Research Paper, in the 19th International Symposium in High-Performance Computer Architecture, Feb. 2013, 12 Pgs.

European Patent Office, Extended European Search Report for Appl. No. 13885657.0 dated Dec. 21, 2016 (7 pages).

Graefe et al., Definition, Detection, and Recovery of Single-Page Failures, a Fourth Class of Database Failures, Aug. 2012 (10 pages).

Hamming, Error Detecting and Error Correcting Codes, The Bell System Technical Journal, vol. XXIX, No. 2, Apr. 1950 (14 pages).

Li et al., MAGE: Adaptive Granularity and ECC for Resilient and Power Efficient Memory Systems, Nov. 2012 (11 pages).

Reed et al., Polynomial Codes Over Certain Finite Fields, Journal of the Society for Industrial and Applied Mathematics, vol. 8, No. 2, Jun. 1960 (6 pages).

Sumant et al., Virtual Memory Management Techniques in 2.6 Kernel and Challenges, IACSIT International Journal of Engineering and Technology, vol. 2, No. 2, Apr. 2010 (5 pages).

Udipi et al., LOT-ECC: LOcalized and Tiered Reliability Mechanisms for Commodity Memory Systems, 2012 (12 pages).

Yoon et al., HP, BOOM: Enabling Mobile Memory Based Low-Power Server DIMMs, ISCA 2012 (26 pages).

Yoon et al., Virtualized and Flexible ECC for Main Memory, Mar. 2010 (13 pages).

Chinese Office Action cited in Appl. No. 201380076235.2 dated Oct. 26, 2017; 9 pages.

* cited by examiner

INVOKING AN ERROR HANDLER TO HANDLE AN UNCORRECTABLE ERROR

BACKGROUND

Memories in electronic devices are vulnerable to errors. For example, electrical or magnetic interference may cause data bits stored within a memory to unintentionally change states. To mitigate such data errors, error protection bits may be stored in a memory in addition to data. A memory controller can use the error protection bits to detect and correct data errors. Examples of error protection bits include error checking and correcting (ECC) codes.

An ECC code can be used for detecting and correcting of up to a specified number of bits (e.g. one-bit error, two-bit error, etc.), If a data error involves an error in more than the specified number of bits, then the ECC code would not be useable to correct the data error, and a fault condition would be indicated.

BRIEF DESCRIPTION OF THE DRAWINGS

Some embodiments are described with respect to the following figures.

DETAILED DESCRIPTION

Figure 1:
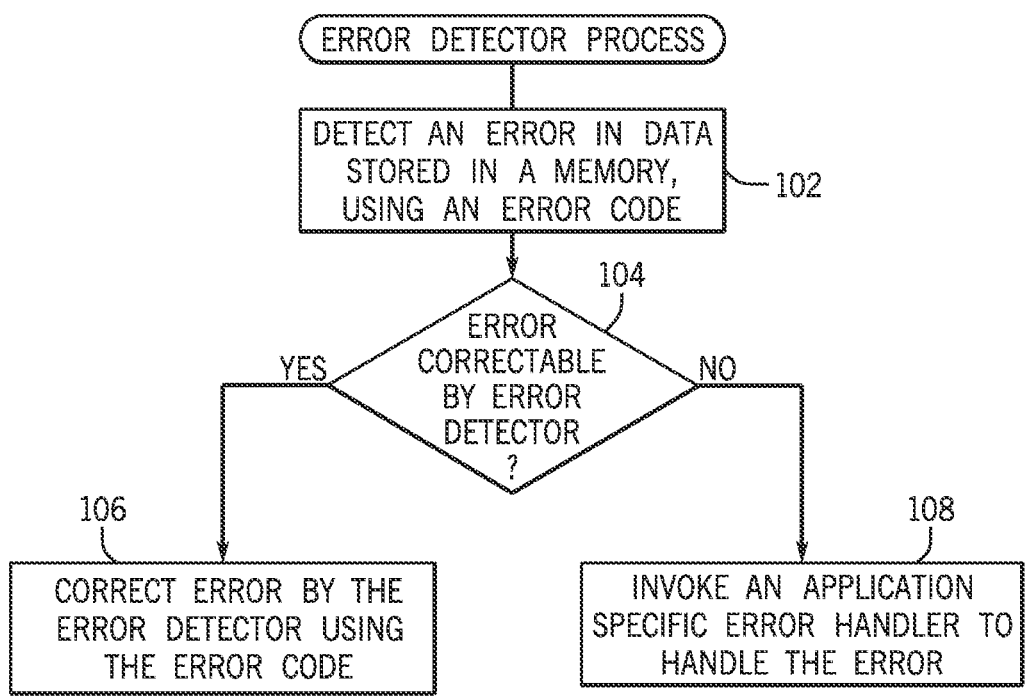
FIG. 1 is a flow diagram of an error detection and correction process, according to some implementations.

A data center can include a relatively large number of components, including processors, memory devices, persistent storage devices, network components, and other devices. Memory devices can be a significant source of system malfunction, especially if there are a relatively large number of memory devices in the data center. Examples of memory devices include dynamic random access memory (DRAM) devices, flash memory devices, phase change memory devices, memristor memory devices, disk-based storage devices, or other types of memory devices.

Error checking and correcting (ECC) codes can be stored in memory devices to detect and correct errors in data stored in the memory devices. An example of an ECC code is a single bit error correction and double bit error detection (SECDED) code, which is capable of detecting up to a two-bit data error, and correcting a single-bit error. For stronger protection, other error correcting techniques can employ ECC codes to protect against failure of an entire device, such as a memory device (also referred to as a memory chip). Examples of such error correction techniques can include a chipkill correcting technique, a single chip-sparing (SCS) technique, or a single device data correcting (SDDC) technique. The foregoing error correction techniques can tolerate the failure of an entire memory device in a rank, where a rank refers to a group of memory devices that are involved in serving a memory request.

In further examples, ECC codes can be provided to tolerate the failure of two memory devices. Examples of such error correction techniques include a double chipkill correcting technique, a double chip-sparing (DCS) technique, or a double device data correct (DDDC) technique.

Increased reliability in using a stronger error correction technique may come at the expense of increased power usage and potentially reduced performance of a system. For example, stronger error correction techniques may involve the use of certain memory arrangements that include a larger number of memory devices per rank, which leads to increased power usage. Also, stronger error correction techniques may use memory arrangements that employ larger cache lines in cache memory, which may be inefficient from a performance standpoint.

Error detection and correction using ECC codes stored in memory (where "memory" can refer to one or multiple memory devices) is performed using error detection and correction circuitry, which can be implemented with hardware. In the ensuing discussion, error detection and correction circuitry is referred to as an "error detector." An error detector can be implemented solely in hardware. Alternatively, an error detector can be implemented as a combination of hardware and machine-readable instructions (e.g. firmware or software).

In the ensuing discussion, it is assumed that the error detector is a hardware-based error detector. However, in alternative implementations, it is contemplated that the error detector can be a combination of hardware and machine-readable instructions.

To increase performance and reduce power consumption, an error detector according to some implementations can employ a less robust error correction technique, with the error detector being able to invoke a separate error handler to handle data errors that cannot be corrected by the error detector. A less robust error correction technique refers to an error correction technique that is able to correct a smaller number of data error bits than another error correction technique. For example, instead of using an error correction technique that can withstand the error of an entire memory device or multiple memory devices, a less robust error correction technique can be employed, such as an SECDED error correction technique. However, in alternative examples, the error detector is able to implement error correction techniques that can correct errors associated with failures of one or multiple memory devices in a rank.

FIG. 1 is a flow diagram of a process according to some implementations that can be performed by an error detector. The error detector detects (at 102) an error in data stored in a memory, using an error code. The error code can be an ECC code or any other information that is usable to detect an error in data stored in the memory. The error code can be stored in the memory along with the data.

The detector next determines (at 104) whether the detected error is correctable or uncorrectable by the error detector using the error code. If correctable, the error detector corrects (at 106) the detected error using the error code. However, if the detected error is uncorrectable, then the error detector invokes (at 108) an application-specific error handler, which can be implemented with machine-readable instructions (that are separate from the error detector). The invoked error handler handles the detected error in the data by recovering the data to a consistent state by retrieving a prior version of the data from a data store, and using a transaction log to recover the data to the consistent state from the prior version of the data.

For example, data in memory may have been copied to a data store in persistent storage. This copy of data can be retrieved from the persistent storage during a recovery procedure of the application-specific error handler to restore data of the memory to a consistent state.

The invoked error handler can include machine-readable instructions of an application that manages the storage of data in data structures in the memory as well as in persistent storage. For example, the application can be a database management application, which stores data in a database having relational tables. In other examples, the application can be a different type of application, such as an application that stores data in a key-value store, or any other type of application that performs intermittent storage of data in memory to a persistent storage and maintains a transaction log.

The application-specific error handler in task 108 recovers the data of the memory to an application-wide consistent state. An application-wide consistent state of data refers to a state of data that is considered to be valid by the respective application.

A transaction log is persistently stored and keeps track of transactions that have modified data in the memory, where modification of the data can include inserting new data, deleting data, or updating data. The transaction log can include both redo information and undo information. Redo information allows a transaction to be re-applied to a previous version of data. For example, the application-specific error handler can retrieve a prior version of data (a state of the data prior to an error detected by the error detector) from the persistent storage into the memory, and can apply the redo information in the transaction log on the retrieved data written to the memory, to re-execute a modification operation that has been performed with respect to the data.

Undo information in the transaction log can be used to undo a modification of data made in the memory. For example, modified data may have been written from the memory to the persistent storage prior to the committing of a transaction. Committing a transaction refers to making the results of the transaction durable. If a failure (such as an uncorrectable data error detected by the error detector) occurs prior to the transaction being committed, a rollback operation can be performed using the undo information to undo the data modification that has been made by the transaction. A rollback causes the data to be reverted back to a prior consistent state of the data, before occurrence of the uncorrectable data error.

Figure 2:
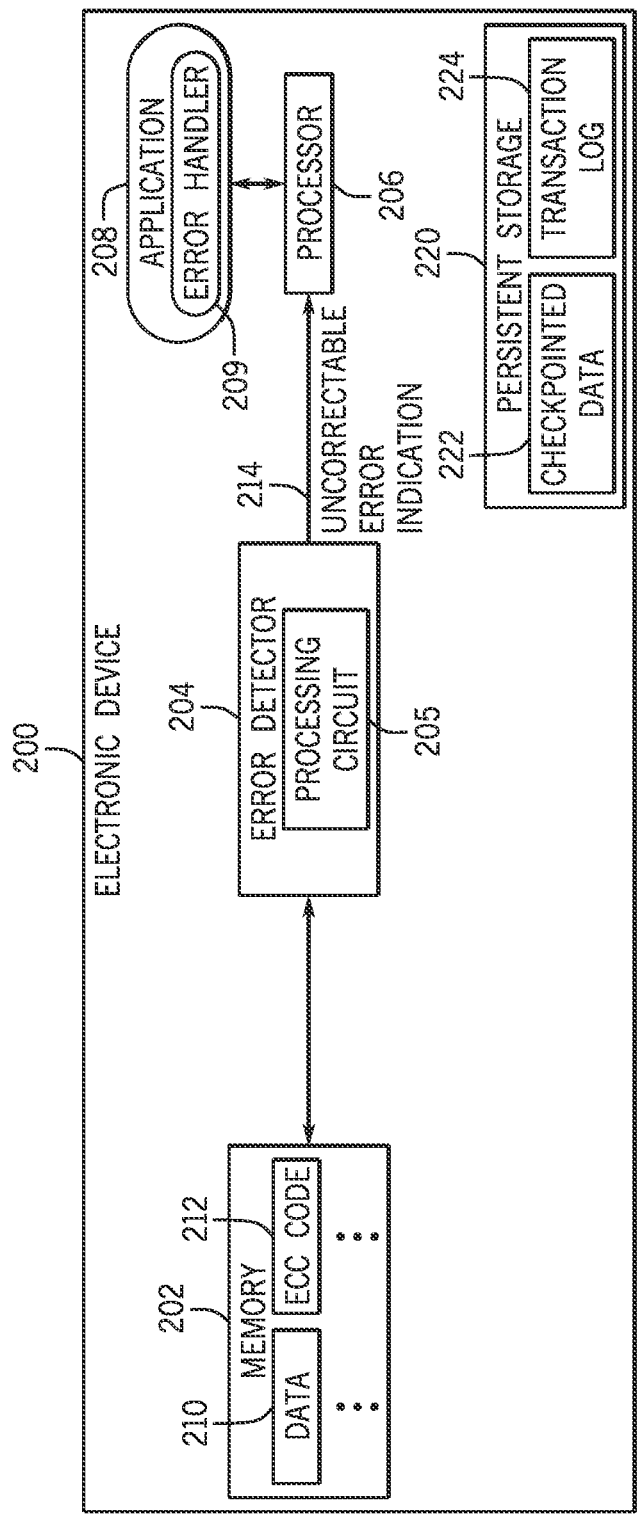
FIG. 2 is a block diagram of an example electronic device, according to some implementations.

FIG. 2 illustrates an example electronic device 200 that includes a memory 202 (which can be implemented with one or multiple memory devices), a hardware-based error detector 204, a processor 206, and an application 208 that is executable on the processor 206. The memory 202 stores data 210 and associated ECC codes 212.

In some examples, the error detector 204 can be part of a memory controller that manages the access (read access and write access) of data in the memory 202. In other examples, the error detector 204 can be part of other circuitry. The error detector 204 includes processing circuitry 205, which can include hardware circuitry to perform specified tasks.

During a write of data to the memory 202, the memory controller can generate ECC code based on the write data, and the ECC code and write data can be stored in the memory 202.

During a read of the memory 202, the memory controller retrieves the data 210 and the corresponding ECC code 212, and the error detector 204 uses the ECC code 212 to detect an error in the read data 210. If an error is detected in the read data 210, the error detector 204 attempts to use the ECC code 212 to correct the data error.

If the error detector 204 determines that the data error is uncorrectable the error detector 204 can send an uncorrectable error indication 214 to the processor 206. Although the uncorrectable error indication 214 is depicted as being sent directly from the error detector 204 to the processor 206, it is noted that in alternative examples, the error detector 204 can send the uncorrectable error indication 214 to an intermediate controller, which in turn can send a corresponding indication (e.g. interrupt) to the processor 206. Receipt of an indication corresponding to the uncorrectable error indication 214 by the processor 206 causes the processor to invoke the application 208. In some examples, the interrupt can cause the processor 206 to initiate an interrupt procedure at an operating system (OS), which in turn can invoke the application 208 to handle the uncorrectable error condition.

The application 208 can be a database management application or any other application that manages the storage of data in the memory 202 as well as in persistent storage 220. The persistent storage 220 can include storage (such as disk-based storage or other non-volatile storage) that can maintain data stored in the persistent storage 220 even if power were removed from the electronic device 200.

The application 208 is associated with an error handler 209 ("application-specific error handler") for handling the uncorrectable error in the data read by the error detector 204. Although FIG. 2 depicts the error handler 209 as being part of the application 208, it is noted that the error handler 209 can be separate from the application 208 in other examples. The handling of the data error by the error handler 209 includes performing a recovery procedure to recover the data to an application-wide consistent state.

In examples where the application 208 is a database management application, the application can perform intermittent (e.g. periodic or non-periodic) checkpointing of data stored in the memory 202. Checkpointing data in the memory 202 involves copying data from the memory 202 to the persistent storage 220 at a given point in time. As shown in FIG. 2, the checkpointing causes checkpointed data 222 to be stored in the persistent storage 220.

Also, the application 208 can maintain a transaction log 224 in the persistent storage 220 to keep track of transactions that have modified data in the memory 202. Although just one transaction log 224 is depicted in FIG. 2, the application 208 can maintain multiple transaction logs in other examples.

The transaction log 224 can include both redo information and undo information (as discussed above). Redo information allows a transaction to be re-applied to a previous version of data, such as the checkpointed data 222. For example, the application 208 can recover a prior consistent state of the data (a state of the data prior to an error detected by the error detector 204) from the checkpointed data 222 to the memory 202, and can apply the redo information in the transaction log on the recovered data written to the memory 202, to re-execute a modification operation that has been performed with respect to the data.

Undo information in the transaction log 224 can be used to undo a modification of data made in the memory 202. For example, modified data may have been checkpointed from the memory 202 to the persistent storage 220 prior to the committing of a transaction. Committing a transaction refers to making the results of the transaction durable. If a failure (such as an uncorrectable data error detected by the error detector 204) occurs prior to the transaction being committed, a rollback operation can be performed using the undo information to undo the data modification that has been made by the transaction. A rollback causes the data to be reverted back to a prior consistent state of the data, before occurrence of the uncorrectable data error.

In some examples, a single-page recovery technique can be employed. Data of the application 208 can be stored in pages, where a page refers to some specified data structure having a predefined size to store data. A single-page recovery allows data of the single page to be recovered, while other pages remain unchanged.

A benefit of performing single-page recovery can be that the single page can be recovered more quickly than an entire database of pages. In a single-page recovery operation, the error handler 209 can fetch previous checkpointed data from the persistent storage 220 for the page, and if the data in the page is dirty (has been modified), the error handler 209 can apply redo or undo information from the transaction log 224 associated with the page to reconstruct a previous consistent state of the page. The single-page recovery technique is a relatively low-latency recovery technique. As a result, an end user may not even notice any quality degradation due to recovery of uncorrectable error by the application 208.

Figure 3:
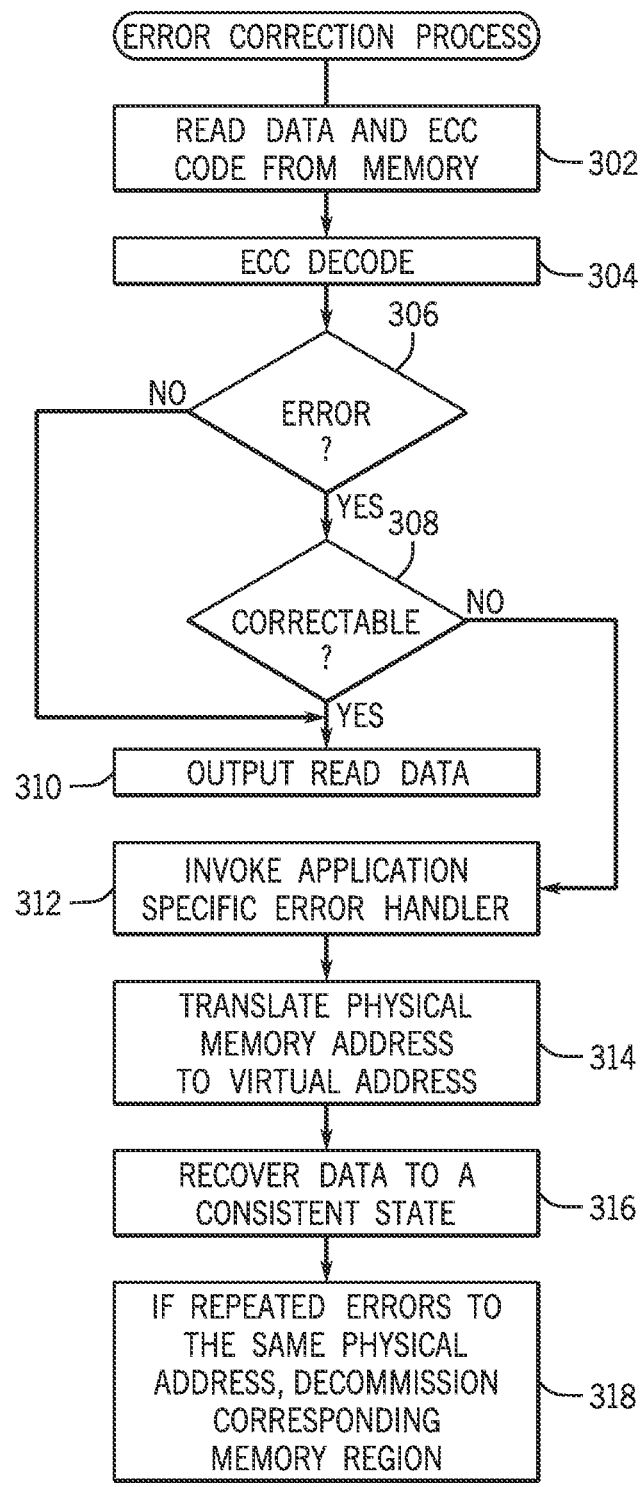
FIG. 3 is a flow diagram of an error detection and correction process, according to alternative implementations.

FIG. 3 is a flow diagram of an error correction process according to alternative implementations. A memory controller reads (at 302) data and the associated ECC code from the memory 202. The error detector 204 performs ECC decoding (at 304) of the read data using the ECC code. The error detector 204 determines (at 306) whether there is an error in the read data. If not, then the read data can be output (at 310) by the memory controller, such as to a cache controller (which can be part of the processor 206 or outside the processor 206).

If a data error is detected, then the error detector determines (at 308) whether the data error is correctable using the ECC code. If so, the read data is corrected, and the corrected read data is output (at 310) by the memory controller.

If the error detector 204 determines (at 308) that the data error is uncorrectable, then the error detector 204 invokes (at 312) the application-specific error handler 209 of the application 208 to handle the uncorrectable data error.

The address of the memory location provided by the error detector 204 to the error handler 209 relating to the data error is a physical address. The error handler 209 can translate (at 314) the physical address to a virtual address, such as by using a reverse mapping (RMAP) technique. The error handler 209 recovers (at 316) the data in the virtual address space, by recovering the data to an application-wide consistent state. The recovered data is written to the memory 202.

The error handler 209 is also able to keep track of the number of times that an uncorrectable error has occurred to a particular physical address. If uncorrected errors to the particular physical address repeats for more than a specified threshold number of times, then the error handler 209 can decommission (at 318) the memory region corresponding to the particular physical address. The decommissioning can be accomplished by sending a message to an operating system or system firmware (e.g. Basic Input/Output System or BIOS code) of the electronic device 200, which can mark the memory region as unusable such that future writes do not occur to the marked memory region. The marked faulty memory region can include a page, a bank, or an entire memory device.

In alternative implementations, instead of the error handler 209 decommissioning a memory region associated with repeated uncorrectable errors, the error detector 204 can determine whether or not a memory region should be decommissioned based on detection of repeated uncorrectable errors.

In accordance with some implementations, a collaborative hardware/software error correction technique or mechanism is provided to improve reliability, availability, and serviceability of an electronic device including a memory, while reducing power consumption.

Various modules (e.g. application 208, error handler 209, error detector 204, etc.) discussed above can be implemented as machine-readable instructions that are executable on a processing circuit. The processing circuit can include a controller (e.g. memory controller), or a processor such as a microprocessor, microcontroller, processor module or subsystem, programmable integrated circuit, programmable gate array, or another control or computing device.

Data and instructions are stored in respective storage devices, which are implemented as one or more computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method comprising:
    detecting, by a detector in a memory controller using an error checking and correcting code, an error in data stored in a memory;
    determining, by the detector, whether the error is uncorrectable using the error code;
    in response to determining that the error is uncorrectable, sending, by the detector to a processor, an uncorrectable error indication and an address of a memory location relating to the error; and
    invoking, at the processor and in response to the uncorrectable error indication, an error handler that is part of an application to handle the error in the data by retrieving, by the error handler based on the address of the memory location relating to the error, a version of the data from a data store, and using a transaction log to recover the data to an application-wide consistent state from the retrieved version of the data.

2. The method of claim 1, wherein the application manages storage of data in data structures stored in the memory and persistent storage.

3. The method of claim 2, wherein the application is a database management application.

4. The method of claim 2, wherein the application is an application that performs intermittent checkpointing of data in the memory to the data store, and that maintains the transaction log including information relating to transactions that have modified data, wherein using the transaction log to recover the data to the application-wide consistent basis comprises using the information relating to the transactions that have modified data.

5. The method of claim 4, wherein the information included in the transaction log includes redo information and undo information, and wherein using the information relating to the transactions that have modified data to recover the data to the application-wide consistent basis comprises:

applying the redo information to re-apply a transaction of the transaction log to a portion of the retrieved version of data; and applying the undo information to undo a modification of another portion of the retrieved version of data.

6. The method of claim 5, wherein applying the undo information to undo a modification of the another portion of the retrieved version of data is performed in response to:

a transaction that produced the another portion of the retrieved version of data not having been committed, and the another portion of the retrieved version of data having been checkpointed by the checkpointing.

7. The method of claim 1, wherein detecting the error is performed by the detector that is a hardware-based detector.

8. The method of claim 1, wherein retrieving the version of data comprises retrieving the version of the data from checkpointed data.

9. The method of claim 8, further comprising:

applying redo or undo information in the transaction log to the retrieved version of data to recover the data to the application-wide consistent state.

10. The method of claim 1, further comprising:

detecting that a memory region has experienced repeated uncorrectable errors; and decommissioning the memory region.

11. The method of claim 1, further comprising: translating, by the error handler, the address of the memory location relating to the error sent by the error detector in the memory controller to a virtual address, the retrieved version of the data being at the virtual address.

12. The method of claim 1, further comprising:

in response to the uncorrectable error indication, interrupting the processor; and invoking, by the interrupted processor, the error handler.

13. An apparatus comprising:

a memory controller comprising an error detector to:

receive data and an associated error checking and correcting code from a memory;

determine, using the error checking and correcting code, whether the data has an error that is uncorrectable; and in response to determining that the data has an uncorrectable error, send an uncorrectable error indication and an address of a memory location relating to the error to a processor; and an error handler associated with an application to be invoked at the processor in response to the uncorrectable error indication, the invoked error handler to recover the data to an application-wide consistent state by retrieving, using the address of the memory location relating to the error sent by the error detector, a version of the data from a data store, and applying a modification indicated by a transaction log to the retrieved version of the data.

14. The apparatus of claim 13, wherein the transaction log includes redo information and undo information, and wherein the error handler is to use the transaction log to recover the data to the application-wide consistent basis by:

applying the redo information to re-apply a transaction of the transaction log to a portion of the retrieved version of data; and applying the undo information to undo a modification of another portion of the retrieved version of data.

15. An electronic device comprising:

a persistent storage to store a transaction log containing information pertaining to a transaction that has modified data;

a memory; an application including an error handler, wherein the application is to manage storage of data in data structures in the persistent storage and the memory;

a memory controller comprising an error detector to:

detect, using an error code retrieved from the memory, an uncorrectable error in data retrieved from the memory;

in response to the uncorrectable error, send an uncorrectable error indication and an address of a memory location relating to the error, the uncorrectable error indication to cause invocation of the error handler, wherein the error handler is to recover the data of the memory to an application-wide consistent state by using the transaction log and by retrieving a version of the data from the persistent storage based on the address of the memory location relating to the error sent by the memory controller.

16. The electronic device of claim 15, wherein the error handler is to:

recover the data by retrieving checkpointed data from the persistent storage and applying the transaction on the checkpointed data.

17. The electronic device of claim 15, wherein the error handler is to translate the address of the memory location relating to the error sent by the memory controller to a virtual address.

18. The electronic device of claim 15, wherein the error handler is to perform single-page recovery of the data of the memory.

* * * * *